United States Patent
Mallard (10) Patent No.: US 9,165,123 B1
(45) Date of Patent: Oct. 20, 2015

(54) SYSTEM FOR INTEGRATING A PLURALITY OF ACCESS CONTROL SYSTEMS HAVING PARTITIONABLE RESOURCES

(76) Inventor: George Mallard, The Woodlands, TX (US)

( * ) Notice: Subject to any disclaimer, the term of this patent is extended or adjusted under 35 U.S.C. 154(b) by 1077 days.

(21) Appl. No.: 12/317,684

(22) Filed: Dec. 24, 2008

(51) Int. Cl.
  *G06F 7/04* (2006.01)
  *G06F 21/30* (2013.01)
  *G06F 21/31* (2013.01)

(52) U.S. Cl.
  CPC ............... *G06F 21/30* (2013.01); *G06F 21/31* (2013.01)

(58) Field of Classification Search
  CPC ................................. G06F 21/30; G06F 21/31
  USPC ........................... 726/5, 7; 713/182, 185, 186
  See application file for complete search history.

(56) References Cited

U.S. PATENT DOCUMENTS

| | | |
|---|---|---|
| 2,714,201 A | 7/1955 | Whitehead |
| 4,341,288 A | 7/1982 | Bass |
| 4,431,086 A | 2/1984 | Moser et al. |
| 4,590,604 A | 5/1986 | Feilchenfeld |
| 4,644,484 A | 2/1987 | Flynn et al. |
| 4,839,640 A | 6/1989 | Ozer et al. |
| 5,200,583 A | 4/1993 | Kupersmith et al. |
| 5,721,909 A | 2/1998 | Oulid-Aissa et al. |
| 5,749,443 A | 5/1998 | Romao |
| 6,707,374 B1 | 3/2004 | Zaharia |
| 7,467,400 B1* | 12/2008 | Moss et al. ................ 726/3 |
| 2002/0010679 A1* | 1/2002 | Felsher ...................... 705/51 |
| 2007/0057057 A1 | 3/2007 | Andresky et al. |
| 2009/0043894 A1* | 2/2009 | Goderis et al. ............ 709/226 |
| 2010/0241595 A1* | 9/2010 | Felsher ...................... 705/400 |
| 2011/0151835 A1* | 6/2011 | Velusamy .................. 455/411 |

OTHER PUBLICATIONS

KMS, "Laredo Cut Sheet", Feb. 2007.
Mallard, "Future of access control tied to integration", Access Control Magazine vol. 34, No. 10 Sep. 1991, pp. 1, 9-11.
Sprik, "HID application note AN004", Sep. 21, 1998 pp. 9-11. www.hidglobal.com/documents/0004_an_en.pdf.
HID, "Understanding Card Data Formats" 2005 http://www.hidglobal.com/documents/understandCardDataFormats_wp_en.pdf.
HID, "Understanding the Corporate 1000" 2005 http://www.hidglobal.com/documents/understandingCorp1000_wp_en.pdf.
Cypress Computer Systems, Inc. model SIO-7200. http://cypressworld.net/index.htm?p=spec&cat=SIO-7200, 2005.
Cypress Computer Systems, Inc. model DPX-7200, Sep. 2003 http://www.cypressworld.com/CD/PDF/cutsheet/DPXCutSheet.pdf.
Cypress Computer Systems, Inc. model DPX-7200 user manual, 2004 http://www.cypressworld.com/CD/PDF/Duprex/DPX-7200.pdf.
Cypress Computer Systems, Inc. model DPX-7200 application note, Nov. 18, 2004 http://cypressworld.com/271101/CD/Duprex/Ethernet/AN-SY-DPX-7200-1_v100.pdf.
HID Model RP40 multiCLASS Reader 6125, 2007 http://www.hidglobal.com/documents/rp15_rp40_rpk40_ds_en.pdf.

(Continued)

*Primary Examiner* — Teshome Hailu (57) ABSTRACT

In setting where a number of entities share a common resource and where those entities wish to exclude unauthorized individuals yet desire partitioned access for a set of individuals from each entity, a system integrates a plurality of sets of authorized credentials from a plurality of entities using networking techniques to allow partitioned access to common resources shared by those entities.

27 Claims, 8 Drawing Sheets

(56) References Cited

OTHER PUBLICATIONS

Backend Authentication Work Group, "Framework for Interagency Authentication of Federal Personal Identity Verification (PIV) Cards", Aug. 2006, http://www.smart.gov/iab/doc.

Digi International ME connector style embedded module Specification Sheet, 2004 http://www.digi.com/pdf/prd_ds_digiconnectme.pdf.

Lantronics, Inc. XPORT Embedded Ethernet Device Server Specification Sheet, Mar. 2008 http://www.lantronix.com/pdf/XPort_PB.pdf.

Texas Instruments Incorporated MSP430 Specification Sheet 2008, http://focus.ti.com/lit/ml/slab034n/slab034n.pdf.

Cypress Computer Systems, Inc. model CVX-1201, 2005 http://cypressworld.com/271101/CD/Converter/SS-CVX-1201_v105.pdf.

Cypress Computer Systems, Inc. model CVX-1200, 2007 http://cypressworld.com/271101/CD/Converter/SS-CVX-1200_v118.pdf.

Opto22 E1 and E2 Brain Boards, 2006 http://www.opto22.com/documents/1546_E1_E2_brain_board_datasheet.pdf.

* cited by examiner

SYSTEM FOR INTEGRATING A PLURALITY OF ACCESS CONTROL SYSTEMS HAVING PARTITIONABLE RESOURCES

TECHNICAL FIELD OF THE INVENTION

This invention relates generally to microprocessor based security systems, and more particularly to electronic security systems where a credential is used to generate an electrical code.

THE BACKGROUND ART OF THE INVENTION

Access control systems have been used to impede unauthorized personnel from using the elevators to gain access to entire floors for over thirty years. Upon entering the elevator cab in an access controlled elevator, a person finds all the floor select buttons unresponsive.

A person is allowed to make floor selections after presenting an authorized credential to a credential reader within the elevator cab. The access control system, upon receiving the indicium from the credential reader, responds by releasing the floor exclusions on the set of authorized floor select buttons for that credential. The person makes their selection from this authorized set and the elevator then responds by delivering the occupants to the selected floor.

In many real estate settings, common areas and resources may be shared among several different entities. These common resources must be used to comfortably utilize the entities' private areas. For example, in an office tower, tenants share the lobby, parking areas, high volume air conditioning (HVAC), and elevators. During off hours, these common resources are restricted to authorized individuals. In the case of elevators or HVAC, only parts (partitions) of the entire building's resource may be utilized by a tenant's authorized employee. Each entity may wish access for thousands of individuals to these resources in order to comfortably access their private space. Consider a high rise office tower housing several large corporations. Those corporations could desire access for all their employees to employee amenities like an automated teller machine (ATM) or a cafeteria on an upper floor. It is common practice for each entity to equip their personnel with electronically readable credentials (coded indicia), which serve as a key to access the entities' private areas. These credentials, when used in conjunction with electrically controlled locks on the portals and computer databases, are known as card access systems. The advantages of card access systems, as taught by U.S. Pat. No. 2,714,201 Identification Selector at Column 1 lines 33-52, are well known to the owners and managers of these properties.

As these systems have proliferated, it has become common for each entity within the building to purchase their own proprietary access control systems. The owners and managers of these properties desire to accommodate each entity's desire to grant access to authorized individuals, yet deny access to all others. The property managers have essentially four choices. They could issue their own credentials to all authorized people, or allow each entity to mount their own credential reader and controls at the building portals. Other techniques require each entity to periodically share their list of authorized credentials with the property management or the entities could expose their credential databases on a common network. Each of these four techniques has significant disadvantages as described below.

Issuing everyone their own building management credential has several disadvantages. First, it requires the purchase and distribution of credentials for everyone authorized to use the common spaces afterhours. Typically, the common area credentials are incompatible with the entity's proprietary standards for credentials. Therefore, this technique often requires the individuals to carry multiple credentials. Additionally, the building management must synchronize their credential list with changes from each entity's roster. The typical implementation is a manual system of faxed or emailed paper work. A common problem with a manual system is the building's database becoming "stale" with outdated information. The result can be terminated individuals still having access to the building and newly hired individuals being denied access because the system which transmits the changes from the tenant to the building management has broken down. The results can range from inconvenience for the newly hired to a potentially dangerous situation where an aggressive terminated employee has afterhours access to the common areas.

Allowing each entity to mount their own credential reader and control system on the building portals results in an aesthetically disagreeable and confusing collage of credential readers at each of the building resource portals. It is difficult and expensive to integrate more that one access control system with partitioned resources, like elevators or HVAC systems. The expense and large number of interconnections required make ordinary integration techniques impractical. Additionally, if one of the controlling systems should fail, often the buildings resources are either locked or unlocked at the wrong times. With the portal controlled by multiple entities, the problem requires diagnostics to pinpoint the trouble source. Even knowing the source of the problem, multiple vendors must frequently be coordinated to resolve the problem. The diagnostic procedure and subsequent vendor coordination slows the repair process when compared to a single portal, single vendor solution.

If the tenant and the management can agree upon a specific credential technology, then building management can update their database of valid access credentials based on a database extraction of the tenant's system. The issue of choosing a specific credential technology has been eased by the introduction of credential readers capable of reading multiple technologies. An example of a multi-technology credential reader is taught by U.S. Patent Application Publication No. 2007/0057057 Synchronization Techniques In Multi-Technology/Multi-Frequency RFID Reader Arrays Page 1 Paragraph [0011], and embodied by the HID Model RP40 multiCLASS Reader 6125.

An example implementation of this technique was demonstrated by George Mallard's article "Future of access control tied to integration" in Access Control Magazine Volume 34, Number 10, September 1991, page one. This solution works well and addresses the aesthetic and service problems of multiple credential readers at the building portals. This technique partially addresses the "stale" database problems because the download and processing cycles are typically a batch process. The typical system has the batch run once a day, first by the entity, then by the property management. Entity credential changes done after their batch wait a full day before becoming active in the building's system. Additionally, the maintenance of the database transfer can be problematic and requires customization of both the entity's and the building management's access control systems software to accommodate the extraction and importing of each entity's authorized credential list. Finally, many companies have become reluctant to share a list of their credential holders with outside entities.

The Federal Government has addressed this same problem of authentication of credentials where several agencies need access to a shared portal. Their method of cross agency authentication is documented by the Backend Authentication Work Group prepared for the Federal Smart Card Interagency Advisory Board (IAB), "Framework for Interagency Authentication of Federal Personal Identity Verification (PIV) Cards", August 2006. This method defines a protocol where one agency can query another agency's security database over a network. Where this method addresses the problem of multiple entity authentications, it does require each entity to expose their security database on a common network and all entities to conform to a standard protocol. On page seven of the report, the authors note that "A secure means of transporting these messages must be devised". Further on page 12, the authors state "The most important aspect of this security (since the message payload will be encrypted) is that a gateway can trust that the message was sent by another trusted gateway". The Federal Government has the resources to implement the security required by this technique. However, in a commercial environment, cost is a factor. Therefore, as is known to those skilled in the art, the cohabitation of databases on a common network both opens the possibility of unauthorized access to sensitive information and is expensive to implement and maintain. The standard protocol for exchange of information may not be supported by all entities, and therefore requires expensive modifications to their access control systems. These factors make the common protocol choice unattractive for commercial users.

The reader communicates the alphanumeric code read from the individual's credentials to the control panel utilizing serial data, clock plus data, or the Weigand interface well known to those skilled in the art. Serial data is sent using an interface standard such as defined by the RS485, RS232, RS422 or other standard. The Weigand interface was defined by Sensor Engineering in the early 1980's and is documented in the HID application note AN004.DOC prepared by Eric Sprik Sep. 21, 1998 page 9.

Figure 3A:
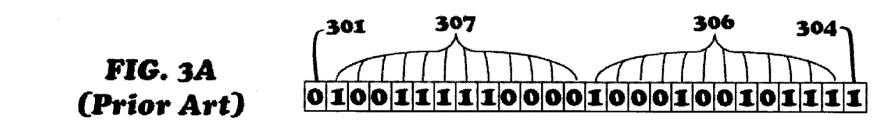
FIGS. 3A and 3B illustrate a prior art technique for typical coding of a credential.
Figure 3B:
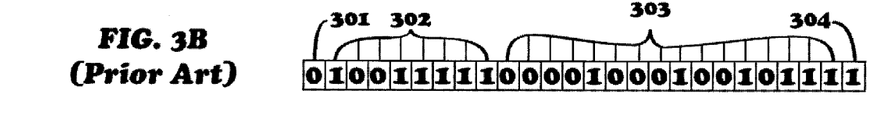

Tech Tip #5 within Mr. Sprik's AN004.DOC page 11 discusses the structure of a common indicia coding. A coding example is shown in FIG. 3A and FIG. 3B. A credential with an indicium facility code of 159 and a personal identification number of 2199 are illustrated in both Figures. This coding has 26 binary digits, or bits, formed from the two parity bits (301, 304), the eight facility code bits (302), and the sixteen personal identification number bits (303).

Refer to FIG. 3A to understand the error checking. The first parity bit (301), is set so that the count of bits with a value of 1 in the combined set of the parity bit (301), and the first twelve significant bits (307) is an even number, in this case six. This scheme is known as "even parity".

The second parity bit (304), is set so that the count of bits with a value of 1 in the combined set of the parity (304), and the last twelve significant bits (306) is an odd number, in this case seven. This scheme is known as "odd parity". Parity is used to insure the coding was correctly read from the credential.

Refer to FIG. 3B to understand the structure of the indicia coding. The eight bits used for the facility code (302) defines a set of two hundred and fifty-six unique facility codes. In FIG. 3B (302), the facility code shown is 159. The sixteen bits of the personal identification number (303), defines a set of sixty five thousand, five hundred and thirty-six unique personal identification numbers. In FIG. 3B (303), the personal identification number is 2199.

An entity's facility code distinguishes their credentials from those belonging to other entities. Consider telephone numbers. A person in Houston could have the same seven digit phone number as someone in New York. But, the area codes make the phone number unique. In the same manner, a twenty six bit credential from entity A may have the same personal identification number as someone from entity B. The facility codes make the credentials unique. Since this twenty-six bit coding scheme was devised by Sensor Engineering in the late 1970's, the success of access control equipment has outdated the twenty-six bit coding scheme.

Schemes with many more bits, both for the facility codes and the personal identification number, have been devised which allows the manufacturer to enter into agreements that allow the entities to "own" their facility codes. This practice is documented in the 2005 HID white paper "Understanding the Corporate 1000" page 1. It should also be noted that some of these newer schemes have more parity bits and/or error checking and correction bits known to those skilled in the art. Essentially, any of the techniques used for error checking and/or correction in serial data transmission can be employed for the credential indicia, for example Cyclic Redundancy Checking.

Elevators are a portal through which tenants pass to access their private spaces. Security methods have been devised to limit use to preauthorized sets of floors. One method simply treats the ground lobby "Hall Call" button that summons an elevator to the floor as a control point. A card reader is associated with the button preventing its use without an authorized credential. Elevators frequently service more than one tenant. This method does not prevent one tenant from accessing another tenant's floor serviced by that same elevator.

A better method for implementing securing elevators is to view them as a partitioned resource, each floor being a partition element. The addition of access control system relays, one for each floor select button, implements the partitioning system. When inactive, the associated floor select button is unresponsive. Upon reception of an authorized indicium, the access control system activates the set of relays corresponding to the floors authorized for that credential. This allows the credential holder to register his request to the elevator control machinery by pressing one of the now responsive floor select buttons. Pressing a floor selection associated with an inactive button will not register with the elevator control machinery.

Figure 2A:
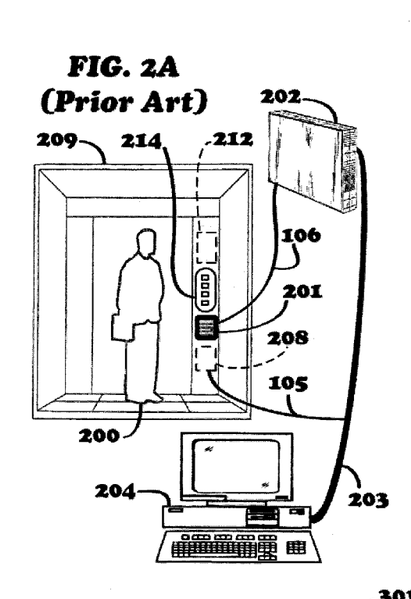
FIGS. 2A, 2B, and 2C are block diagrams of a prior art access control system.

Referring to FIG. 2A, the individual (200) approaches resource portal (elevator cab) (209) and presents his credentials to reader (201). The electrically encoded identification is transmitted to control panel (202) via connection (106). The panel (202) then formats this identification into a message and transmits it to the monitoring computer (204) via communication line (203). This message is received by the computer (204) which processes the message. The computer (204) consults a database of authorized users returning a message that authorizes access to the appropriate portions of the resource. The resource partitioning panel (208) receives the message from communication line (105), activating appropriate relays FIG. 2C (211a through 211n) within resource partitioning panel (208). Each relay FIG. 2C (211a through 211n) corresponds to a partition of the resource. In the example of an elevator control system, the resource partitions correspond to floors. A floor selection will only be registered as a floor call by the elevator machinery if the associated relay FIG. 2C (211a through 211n) is active.

Figure 2B:
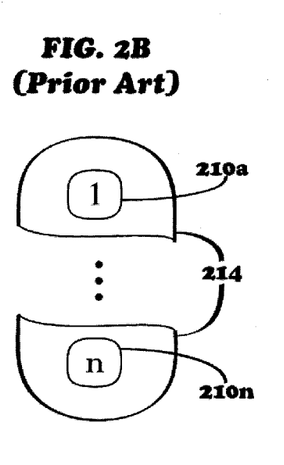

Referring to FIG. 2B, the resource selection panel (214) is illustrated for an elevator. The floor select buttons (210a through 210n) are mounted on the resource selection panel (214). The credential holder FIG. 2A (200) closes the associated electrical contact FIG. 2C (210a through 210n) by pressing the button.

Figure 2C:
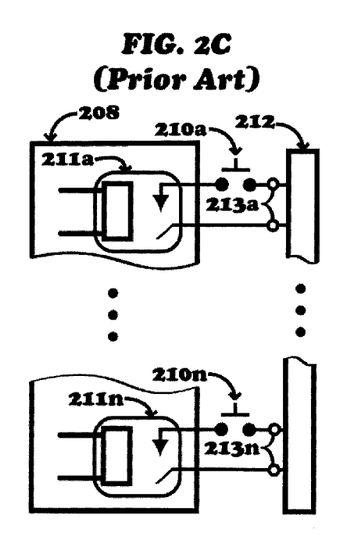

Referring to FIG. 2C, the resource partitioning panel (208) circuitry is illustrated controlling access to the resource, elevator floor selections. The floor select buttons (210a through 210n) are normally open pushbuttons. The partitioning relays (211a through 211n) normally open contacts are wired in series with the floor select buttons (210a though 210n). The elevator machinery control (212) registers a closure on the floor select inputs (213a through 213n) as a floor call and responds by delivering the occupant (200) to the corresponding floor. When secure, closure of the floor select button (210a through 210n) is not seen by the elevator machinery control inputs (213a through 213n), because the circuit is open at the inactive partitioning relays (211a through 211n). Thus, the partitioning panel (208) prevents floor requests from being registered. When the occupant (200), who is a credential holder, presents a valid credential to the credential reader (201), the access system responds by activating only those partitioning relays (211a through 211n) corresponding to the subset of floors the credential holder is authorized to access. The selected partitioning relays (211a through 211n) are active for the period of time deemed sufficient for the credential holder to make his selection. The partitioning relays (211a through 211n) outside of the subset are not active. Thus, the floor select buttons not included in the subset are not responsive. Some of the newer elevator machinery controls provide specific partitioning relay inputs. Software within the elevator machinery controls effectively places the partitioning relays (211a through 211n) in series with the floor selection buttons (210a though 210n).

The number of floor select buttons in high rise elevators frequently exceed the relay capacity of common access control panels. Often, the resource partitioning panel (208) is implemented as independent controller. The Optomux controller, manufactured by Opto22 of Temecula, Calif., has the capacity for an array of up to sixteen relays. Should an elevator require more than sixteen control relays, multiple Optomux panels may be grouped implementing a larger resource partitioning panel (208). A string of ASCII characters controls the Optomux. Received from an RS-485 or Ethernet circuit, the string indicates which relays are to be active and for how long. When an indicium is presented to the reader (201), the access control system computer (204) responds with a string appropriate for that credential. This string is directed to the resource partitioning panel (208). The resource partitioning panel (208) activates the predefined subset of floor select relays (211a through 211n), as directed by the aforementioned string. Only then is the credential holder is free to make their floor selection. Because only the predefined set of floor selection buttons are active, the credential holder selection is limited to that set. After a short period of time, a typical value being 15 seconds, the floor select relays (211a through 211n) are de-activated, securing the floor select buttons.

It should be noted that U.S. Pat. No. 4,644,484 Stand-alone access control system clock control at Column 2 lines 38-41 teaches that the cardholder database can be incorporated within the control panel (202). By extension, cardholder's authorized resource partition control strings are also included in some control panels.

The Laredo interface, as produced by KMS Systems, Inc., which was demonstrated to the public at TechSec in Dallas February 2007, incorporated certain features used in the present invention. However, the Laredo system presented did not incorporate the "Virtual Card Read" described below.

A method to extend credential reader signals point to point over a network is illustrated by the Cypress Computer Systems, Inc. single reader extender model SIO-7200. As described on page one of the Cypress Computer System user manual, the 7200 series is a paired central and remote point to point network devices. The Nov. 18, 2004 setup document further illustrates this with the central device's IP address requiring the remote device's IP to be entered in the setup, page 8. Similarly, the remote device's IP is required when setting up the central device. In contrast to a point to point system, the invention described herein is a multipoint network system.

The DataBender™ series of manufactured by Cypress Computer Systems, Inc. mutate a credential indicium from one bit structure and/or electrical format to another, preserving the indicium personal identification number as best it can. The CVX-1201 and the CVX-1200 offers test modes where predefined indicia are output. However, the DataBender™ output is not under the control of an external input. Instead, it simply reformats the input indicium into the same indicium represented in a different format. The DataBender™ output is not a network message routed to the originating panel from a plurality of potential panels. Nor can the DataBender™ test indicium output be adjusted. The present invention described below uses an external contact's active state to control the generation of a predefined pseudo-credential message within a sequential framework of outputting the original credential and waiting for a response within a certain time frame. That pseudo-credential message is reflected back into the originating panel from a plurality of possible originating panels. The pseudo-credential message, in certain cases, retains the Facility Code of the original indicium.

This invention differs from a distributed database system, as taught by U.S. Pat. No. 5,721,909 Distributed Database Architecture and Distributed Database Management System for Open Evolution at Column 1 lines 32-40. Specifically, this invention lacks point 3 ("true database not a collection of files that are stored at each node") and point 4 ("the full functionality of a database management system"). In the present system, each entity manages their own list of credentials, the system is a collection of independently managed files. No relationship or linkage exists between the entities' lists of credential holders. In the present systems by design, there is no mechanism or administrator feature that would allow a single entity to manage all the access control system's databases.

SUMMARY OF THE INVENTION

The invention disclosed herein addresses the problems outlined above with the unique solution of the building's access control system reading the credential indicium and repeating the entire indicium to each entity's proprietary access control system. A Pseudo-Reader (receiver) is employed to generate impulses compatible with the entity's proprietary system credential reader inputs. The invention then waits for the proprietary system to either grant or deny the credential. The "pseudo-reader" relays this decision to the networked access control panel by use of a "Virtual Card Read". Control of the portal or resource is then defined by the pseudo-indicium privileges granted by the system administrator.

It will be understood by those skilled in the art, the "Virtual Card Read" technique works as well to control a portal as it does to control a partitioned resource. A major advantage for the system administrator, an entire entity's credential holder list can be administered as a single card, the pseudo-credential.

The present invention compartmentalizes security by providing each device in the system with just enough information and privileges to decide if a credential is allowed entry. The present invention does not require exposure of the entity's entire database, either by transfer to a third party or on a conventional network. The indicium is presented as a credential read at the entity's card reader input. Thus, the only input operation possible from the present invention is the transmission of a credential's indicium. The only information returned from the entity is the credential's validity for a particular portal. The scope of these two operations is enforced by the entity's access control system hardware. Thus, the entity's database is shielded from wholesale attack and possible compromise.

The present invention allows the entities to authorize access to their individuals within the framework of their ordinary internal processes. The present invention does not require disclosure of the complete list of credentials nor does it require extensive modifications of existing systems. Changes in the entity's list of authorized users are implemented immediately, without the lag time normally associated with conventional methods.

The network access control panel extends the credential indicium to a plurality of Pseudo-Readers panels. Thus, a single credential read can be tested by number of entities. Also, a single Pseudo-Reader panel can service a number of resource portals controlled by network access control panels. Thus, network Pseudo-Reader panels and network access control panels form a network web which can service a plurality of resource portals FIG. 1 (209*a*) through (209*n*) from a plurality of entities FIG. 1 (202*a*) through (202*n*).

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENT

Figure 1:
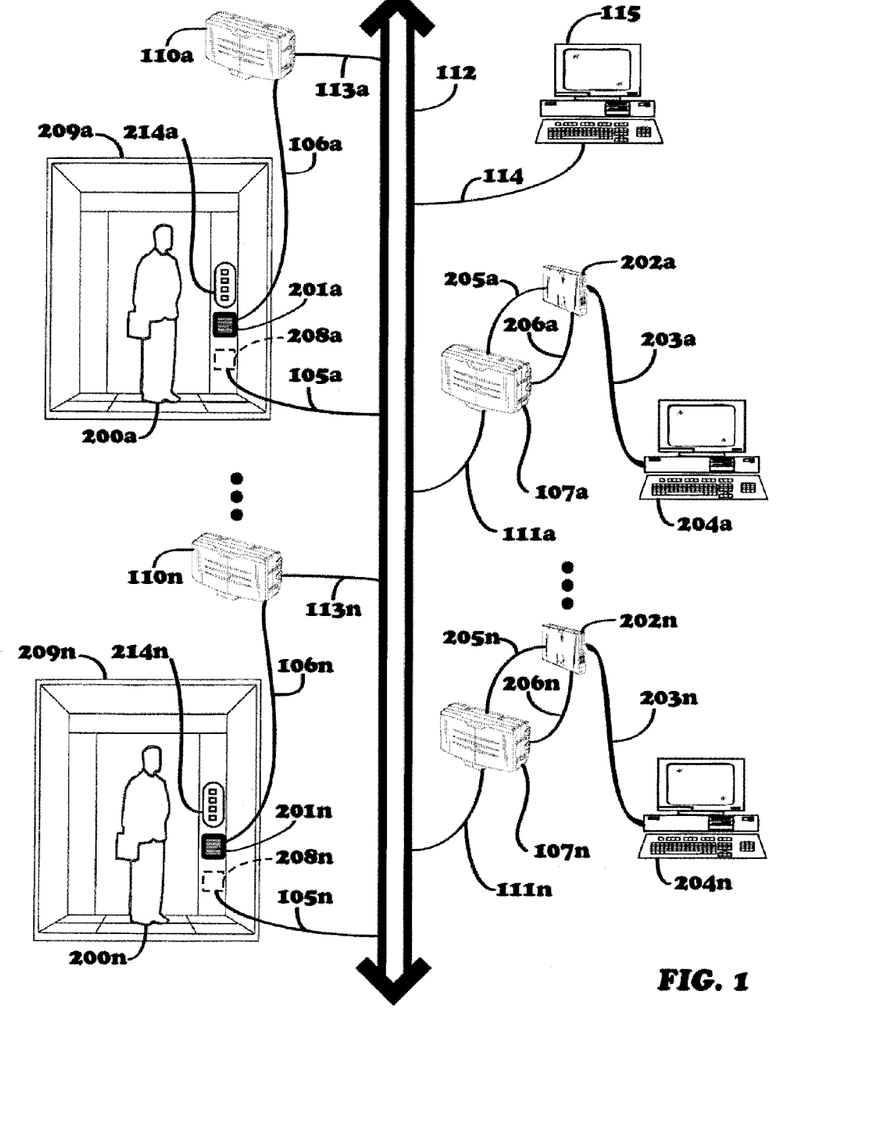
FIG. 1 is a block diagram illustrating the present system for integrating multiple access control systems.

Referring to FIG. 1, access to the resources is controlled at portals (209*a* through 209*n*) by partitioning relay panels (208*a* through 208*n*), which in turn are controlled by the respective network enabled access control panels (110*a* through 110*n*). The resource selection panel (214*a* through 214*n*) is used by the credential holder (200*a* through 200*n*) to make his selection. Credential readers (201*a* through 201*n*) are connected to the respective network enabled access control panels (110*a* through 110*n*) via connections (106*a* through 106*n*). The network enabled access control panels (110*a* through 110*n*) are connected to the network (112) by cables (113*a* through 113*n*). The partitioning relay panels (208*a* through 208*n*) are connected to the network (112) via cables (105*a* through 105*n*). Pseudo-Reader panels or receivers (107*a* through 107*n*) are connected to network (112) by cables (111*a* through 111*n*). Pseudo-Reader panels (107*a* through 107*n*) are connected to the entity's legacy access control panels (202*a* through 202*n*) reader inputs by connections (206*a* through 206*n*). The entity's legacy access control panels (202*a* through 202*n*) outputs, which are typically used to control locking devices, are connected to the Pseudo-Reader panels (107*a* through 107*n*) by respective connections (205*a* through 205*n*). The entity's legacy access control panels (202*a* through 202*n*) connect to their respective database computer systems (204*a* through 204*n*) by cables (203*a* through 203*n*).

A management computer (115) is provided to implement a standard access control system for credentials issued by the property management. It is connected to the network by connection (114). In addition to administering property management credentials, computer (115) also provides audit functions for previous entries and attempted entries. This computer (115), also provides the functions of historical entry logging and alerting monitoring personnel. Alerting function includes invalid credential attempting entry, door lock malfunctions, and doors being propped or forced open. It should be noted that the functions of credential management, audit, history logging, and alerts may be divided among a plurality of computers (115).

The computer (115) houses a database which generates signals controlling the partitioning relay panels (208*a* through 208*n*) based on the privileges granted the presented credential. Upon receiving a message indicating a credential holder is requesting access to the resource, the computer (115) responds with the signals to release the restrictions on the appropriate resource partitions.

The individual (200*a*) approaches the resource portal (209*a*) and requests access by presenting his credentials to the credential reader (201*a*). The credential reader (201*a*) reads the credential and translates it into an electrically encoded indicium. The indicium is transmitted to network enabled control panel (110*a*) via connection (106*a*). The panel then formats this indicium into a network message and places it on the network (112) via network connection (113*a*). This message is received by a plurality of Pseudo-Reader panels (107*a* through 107*n*) via network connections (111*a* through 111*n*).

The Pseudo-Reader panels (receivers) (107*a* through 107*n*) examine the Facility Code from the credential. If the Facility Code matches the entity's Facility Code, the Pseudo-Reader panel generates either a Weigand pulse stream or serial data stream which reflects the electrically encoded identification as it would be generated by an actual credential reader (201*a* through 201*n*). This identification data stream is directed into the entity's legacy access control system via connection (206*a* through 206*n*). The entity's legacy access control system will then vet the credentials by ordinary means as described in the prior art and indicate an authorized user by activating an electrical contact within (202*a* through 202*n*). These electrical contacts are typically used for controlling a door lock, but the present invention it is monitored by Pseudo-Reader panels (107*a* through 107*n*) via connection (205*a* through 205*n*).

If indicated by the electrical contact, a "Virtual Card Read" is generated and transmitted to the originating panel. The "Virtual Card Read" will contain a credential indicium of a credential predefined by the system administrator. That "Virtual Card Read" credential will be granted access to all the levels, portals, and privileges granted the associated tenant by the system administrator. Thus, all the authorized credentials associated with that tenant are translated into the pseudo-indicium.

An alternative embodiment of this invention replaces the individual's personal identification number FIG. 3B (303)

with a predefined number, preserving the facility code FIG. 3B (302). The facility code FIG. 3B (302) and the predefined personal identification number is sent as the pseudo-indicium for the presented credential.

When the originating panel receives the "Virtual Card Read" message, it processes it as if a credential with that indicium had been presented at the panel's credential reader. The "Virtual Card Read" indicium is processed by the main access control system and the person is allowed to select their destination from the set predefined for that tenant. In the case of environmental controls, the person is allowed (or allowed to select) after-hours air conditioning and/or lighting. In the case of a portal, the person is allowed or disallowed access.

Figure 4A:
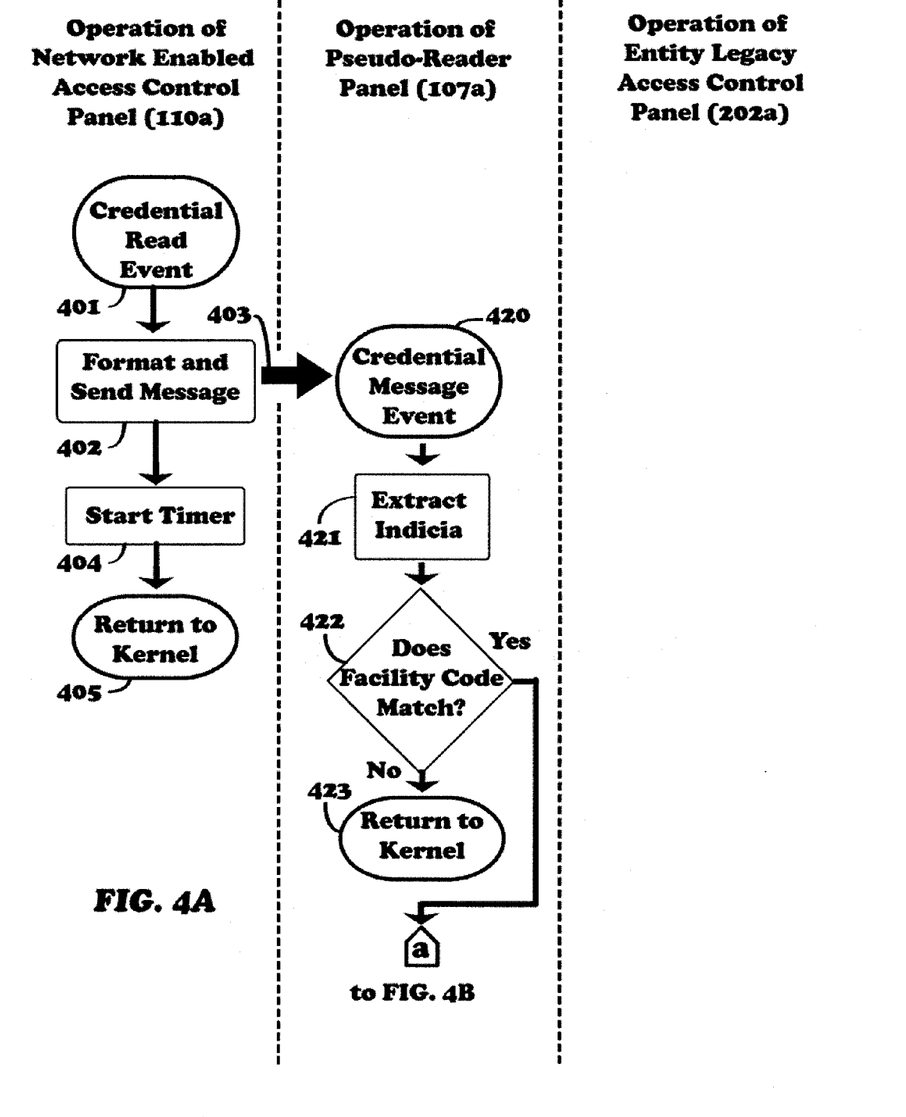
FIGS. 4A, 4B, and 4C is a flow diagram illustrating operation of the present system.
Figure 4B:
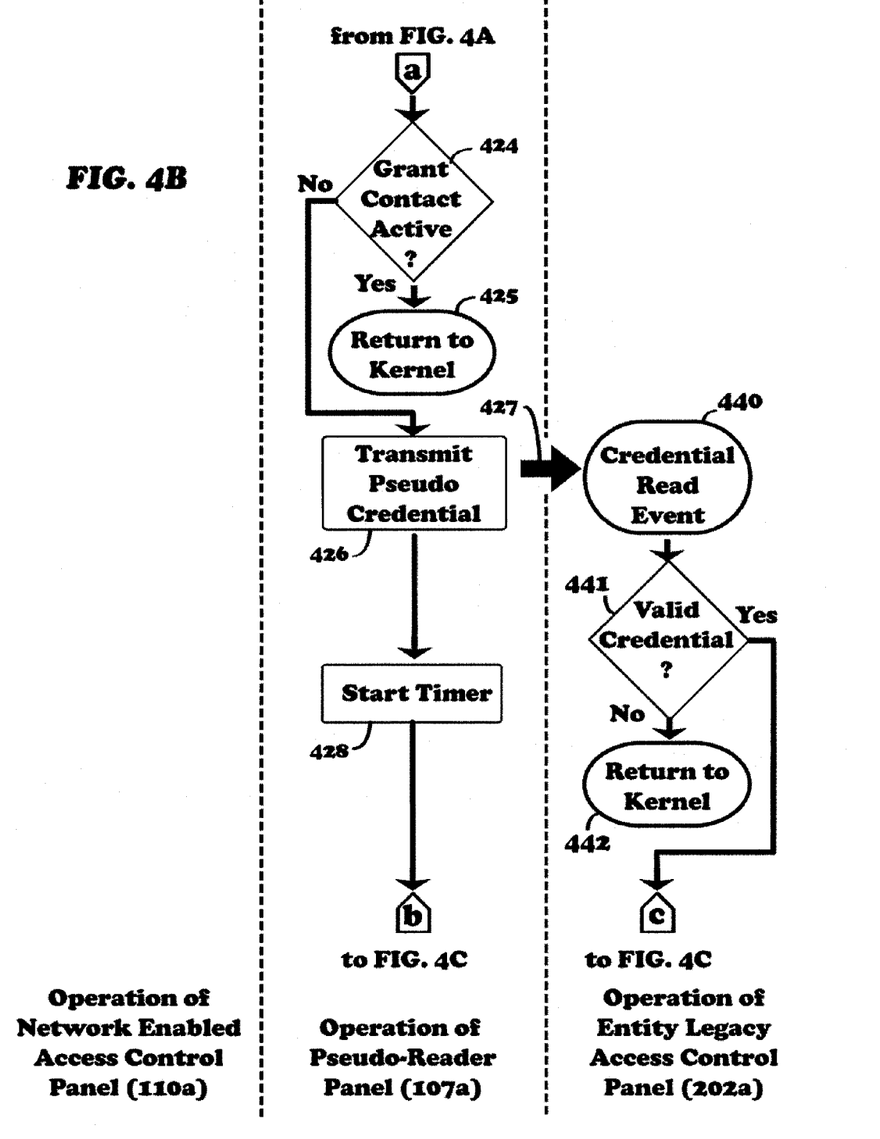
Figure 4C:
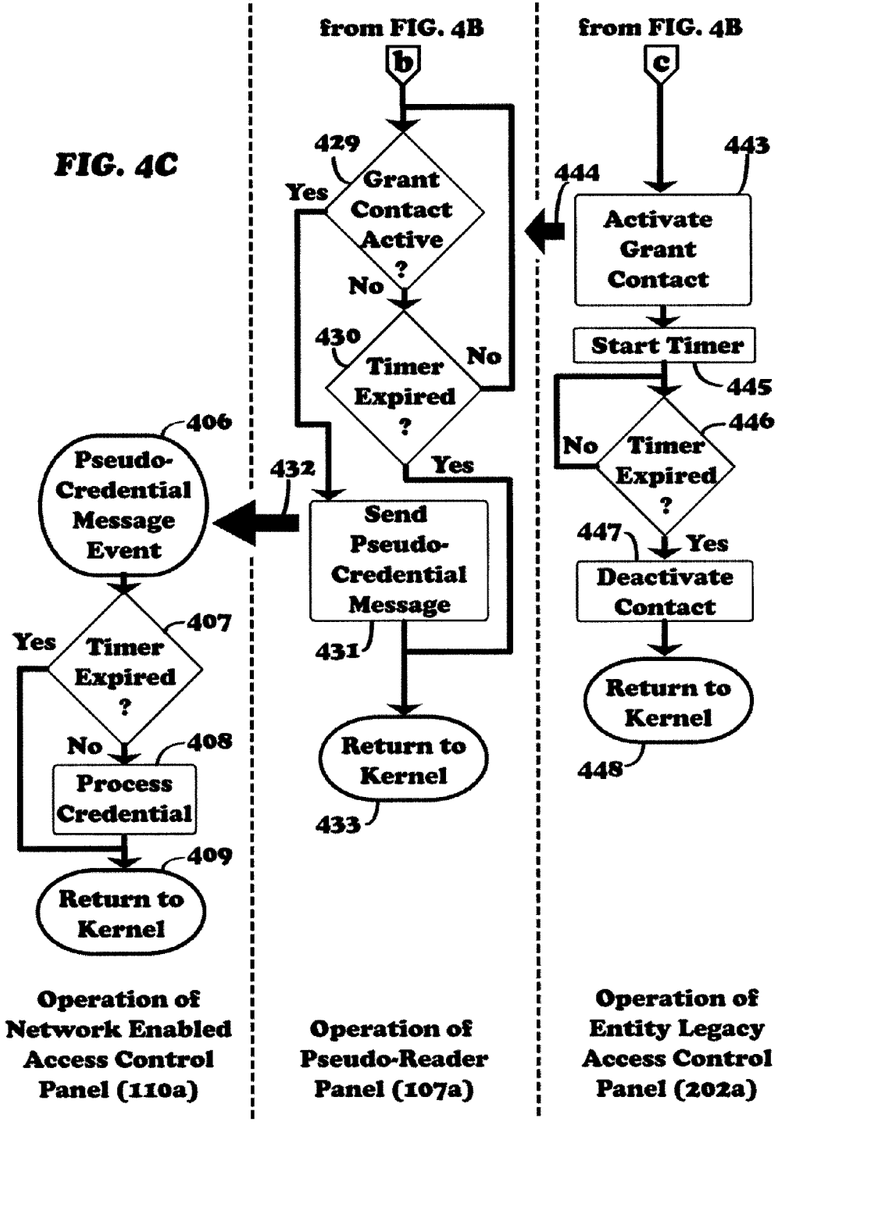

The simplified flowchart FIG. 4A, FIG. 4B and FIG. 4C, show the interaction between the three elements to grant a credential access to the portal FIG. 1 (209a) from the entity's legacy card access system FIG. 1 (202a). Those three elements are the network enabled access control panel FIG. 1 (110a) that controls the portal FIG. 1 (209a), the Pseudo-Reader panel FIG. 1 (107a), and the entity's legacy access control panel FIG. 1 (202a).

The flowchart does not consider the scheme where the entity's legacy access control panel FIG. 1 (202a) presents a "Deny" or "Handicap" relay contact to the Pseudo-Reader panel FIG. 1 (107a). Instead, the Pseudo-Reader panel FIG. 1 (107a) grant timer will expire waiting for a grant indication from the legacy access control panel FIG. 1 (202a) if the credential is not valid.

Figure 5:
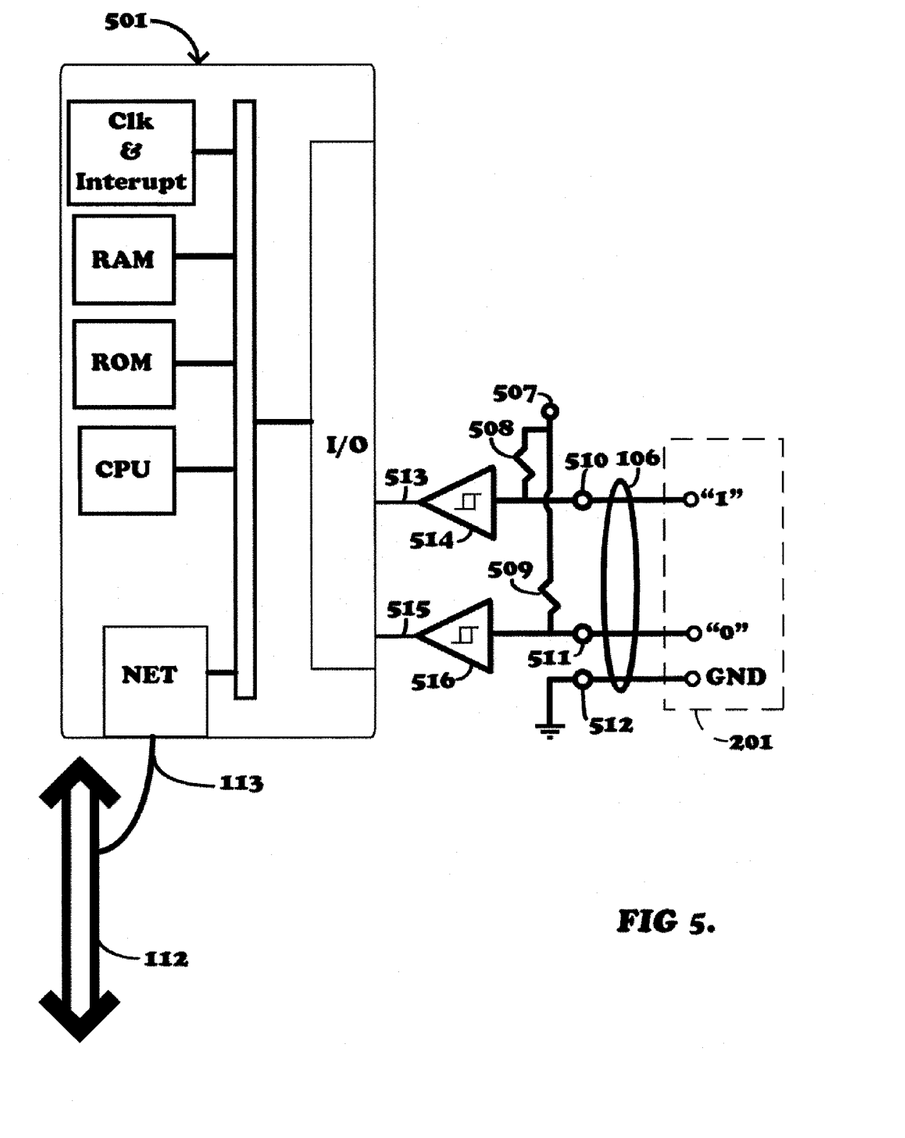
FIG. 5 is a schematic-block diagram of network enabled access control panel for use with the system of the present invention.

The network processor FIG. 5 (501) incorporated into each of the network enabled access control panels FIG. 1 (110a through 110n) has kernel software typically provided by the network processor manufacturer. Network maintenance and other housekeeping tasks are typically performed by the kernel software. Message processing is an interrupt response routine which is called from the kernel software. When a credential is read at reader FIG. 1 (201a), the network enabled access control panel FIG. 1 (110a) kernel software interrupts what it was doing and calls the procedure starting at Credential Read Event FIG. 4A (401). When a grant message is received from the network FIG. 5 (112), the network processor FIG. 5 (501) kernel software calls the message processing procedure, which starts at Grant Message Event FIG. 4C (406). Ping requests, Arp requests and other network housekeeping functions are handled by the network processor's kernel software and are not typically forwarded to message handling interrupt procedures.

One network processor FIG. 5 (501), in an embodiment of this invention, serves a plurality of portals and readers if equipped with a suitable number of inputs and outputs.

The message FIG. 4A (403) is sent out on the network for the Pseudo-Reader panels FIG. 1 (107a through 107n) to receive. Control of the network processor FIG. 5 (501) is passed back to the kernel software in Return to Kernel FIG. 4A (405).

Figure 6:
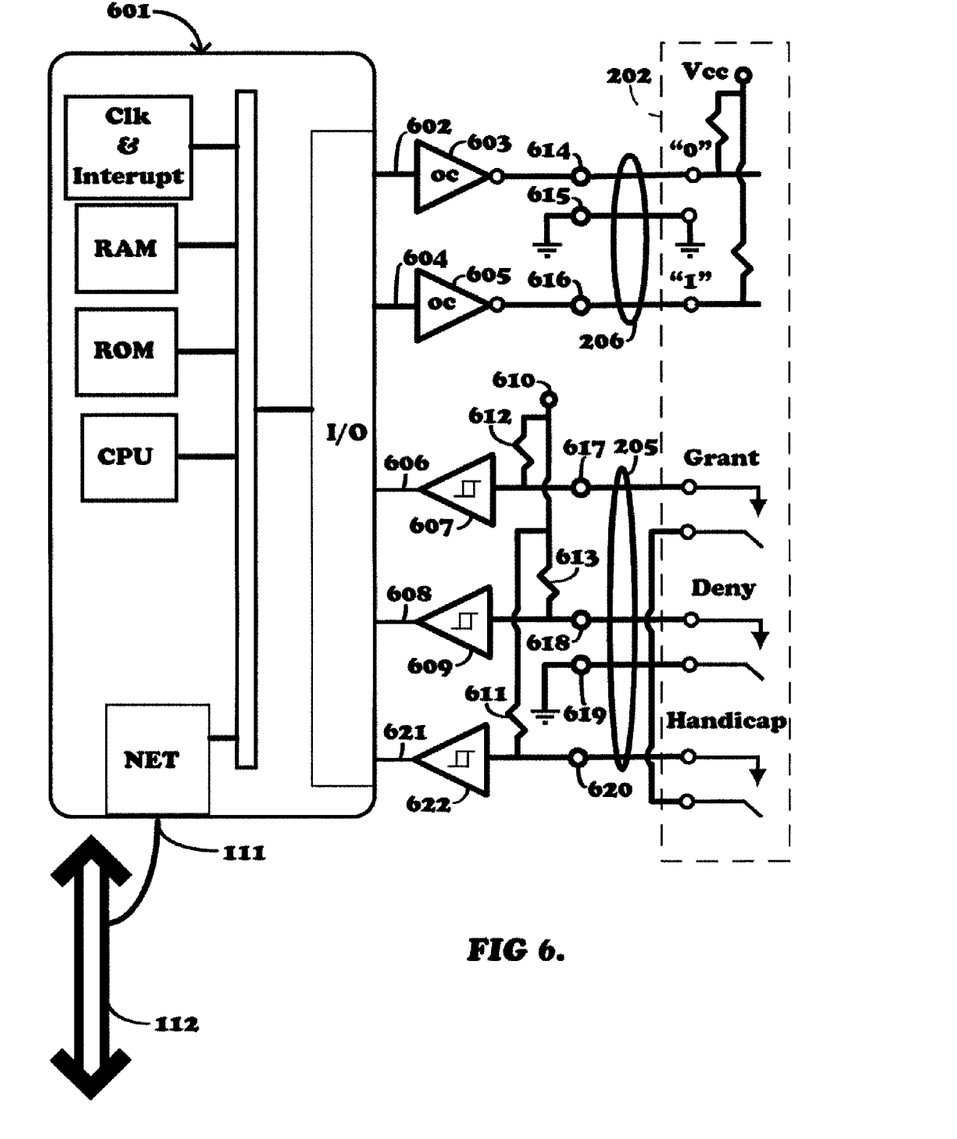
FIG. 6 is a schematic-block diagram of pseudo-reader panel for use with the system of the present invention.

The Pseudo-Readers panels FIG. 1 (107a through 107n) each have a network processor FIG. 6 (601). The network processor incorporates kernel software which performs network maintenance and other housekeeping tasks. When a message is received from the network FIG. 6 (112), the Pseudo-Reader's network processor FIG. 6 (601) kernel software calls the message processing procedure starting at Credential Message Event FIG. 4A (420). The credential is processed and control is passed back to the kernel software in Return to Kernel FIG. 4A (423) or FIG. 4C (433). Ping requests, Arp requests and other network maintenance functions are handled by the network processor's kernel software and are not typically forwarded to message handling interrupt procedures.

One network processor FIG. 6 (601), in an embodiment of this invention, serves a plurality of entity reader panels if equipped with a suitable number of inputs and outputs.

Refer to FIG. 4A, FIG. 4B and FIG. 4C to understand the following narrative of overall process flow, the narrative includes three example credentials. The first credential will be denied because Facility Code is not valid. The second credential will be denied because the personal identification number is not valid for the entity. The third example credential presented will be valid and granted access to a partition of the resource.

Consider the process flow when the first example credential does not belong to the entity's set of credentials. When a credential is read, the network enabled access control panel FIG. 1 (110a) kernel software passes control to Credential Read Event (401), transmits the message (403) in Format and Send Message (402), and starts the transaction timer (404). Finally, control is returned to the kernel software in Return to Kernel (405).

The Pseudo-Reader panel FIG. 1 (107a) kernel software passes control to Credential Message Event (420) upon reception of the Credential Message (403), then Extract Indicia (421) processes the message to extract the Facility Code. The Facility Code Match (422) "No" branch is taken, and control is returned to the kernel software in Return to Kernel (423). A message indicating a Facility Code failure, in an embodiment of this invention, is transmitted over the network FIG. 1 (112) by the Pseudo-Reader panel when the indicium failed the Facility Code Match (422) before Return to Kernel (423).

Consider the process flow for the second example credential that is not valid for the entity associated with Pseudo-Reader panel FIG. 1 (107a). When a credential is read, the network enabled access control panel FIG. 1 (110a) kernel software passes control to Credential Read Event (401), transmits the message (403) in Format and Transmit Message (402), and starts the transaction timer (404). Finally, control is returned to the kernel software in Return to Kernel (405).

The Pseudo-Reader panel's FIG. 1 (107a) kernel software passes control to Credential Message Event (420) upon reception of the Credential Message (403), then Extract Indicia (421) processes the message to extract the Facility Code. The next step tests the Facility Code Match (422). This credential passes the test and control flows via the "Yes" branch to test if the Grant Contact is Active (424).

If the grant contact is active, then Grant Contact Active (424) "Yes" branch is taken and control returns to the kernel (425). This prevents an entity from granting a credential that was read immediately after another credential was granted, but before the entity's panel has reached Return to Kernel (448) for that previous credential processing.

An alternative implementation of the "granting procedure", is another interrupt driven procedure where the interrupt is driven by the contact going active, otherwise known as edge triggering. As the network processor FIG. 6 (601) waits for the contact to move from the inactive to the active state, the test of the Grant Contact Active (424) is not needed.

The Grant Contact Active (424) "No" branch leads to Transmit Pseudo Credential (426). The grant timer is started (428), the entity's legacy access control panel grant contacts are tested (429), and the grant timer is tested (430). If neither the contacts test active (429), nor the timer has expired (430), then the Pseudo-Reader panel loops again, testing both the contacts (429) and the timer (430). In this case, the timer expires (430) because the example credential is not valid for the entity's legacy access control panel FIG. 1 (202a).

The credential message (427) passes the indicium to the entity's legacy access control panel FIG. 1 (202a). Upon receiving the credential indicium, the entity's kernel software responds by calling the Credential Read Event (440). The credential is vetted in Valid Credential (441), just as it would from a directly attached credential reader. Because the credential is not valid, the "No" branch is taken and control returns to the kernel software via Return to Kernel (442).

After the grant timer expires in the Pseudo-Reader panel FIG. 1 (107a), control is passed back to the kernel software via the "Yes" branch of Timer Expired (430), then Return to Kernel (433). As is known to those skilled in the art, it is possible to add a Deny or Timer Expired message transmission into the "Yes" branch of Timer Expired (430) before Return to Kernel (433).

Finally, consider the process flow for the third example credential that is valid for the entity. When a credential is read, the network enabled access control panel FIG. 1 (110a) kernel software passes control to Credential Read Event (401), transmits the message (403) in Format and Transmit Message (402), and starts the transaction timer (404). Finally, control is returned to the kernel software in Return to Kernel (405).

The Pseudo-Reader panel's FIG. 1 (107a) kernel software passes control to Credential Message Event (420) upon reception of the Credential Message (403), then Extract Indicia (421) processes the message to extract the Facility Code. The next step tests the Facility Code in Facility Code Match (422). This credential passes the test and control flows via the "Yes" branch to test Grant Contact Active (424). For this example, assume the entity's Grant Contacts are inactive and control flows out the "No" branch of Grant Contact Active (424) to Transmit Pseudo Credential (426) via message (427). The grant timer is started (428), the entity's legacy access control panel Grant contacts are tested (429) and the grant timer is tested (430). If neither the contacts have become active (429), nor the timer has expired (430); then the Pseudo-Reader panel loops again, testing both the contacts (429) and the timer (430).

The message (427) passes the credential indicium to the entity's legacy access control panel FIG. 1 (202a). Upon receiving the credential indicium, the entity's kernel software responds by calling the Credential Read Event (440). The credential is vetted in Valid Credential (441), just as it would from a directly attached credential reader. Because this credential is valid, control passes out the "Yes" branch to Activates the Grant Contact (443). This generates a condition (444) that the Pseudo-Reader panel FIG. 1 (107a) checks indicating the credential indicium is valid. A contact timer is started in Start Timer (445), and is tested in Timer Expired (446). If the "No" branch is taken, the contact timer is tested again. If the timer has expired, the "Yes" branch is taken. The grant contact is deactivated in Deactivate Contact (447), and control is returned to the entity's legacy access control panel kernel software in Return to Kernel (448).

When the Pseudo-Reader panel FIG. 1 (107a) tests the Grant Contact for Active (429) and control passes out the "Yes" branch, the step Send a Pseudo-Credential Message (431) is called sending a pseudo-credential message (432) to the originating network enabled access control panel FIG. 1 (110a).

A pseudo-credential message (432) received by the network enabled access control panel FIG. 1 (110a), causes the kernel software to pass control to Pseudo-Credential Message Event (406). The transaction timer is started in Start Timer (404), then tested in Timer Expired (407). For this example, assume the transaction has not gone stale and is in fact the same indicium as used when the Start Timer (404) was last called. Therefore, the transaction passes the timer and indicium match test and the "No" branch is taken. The network enabled access control panel FIG. 1 (110a), extracts and processes (408) the pseudo-credential FIGS. 7 (754 and 755a through 755n) from the message FIG. 7 (750). The pseudo-credential is processed as if it had been read at the credential reader FIG. 1 (201). Control is returned back to the kernel software in the final step Return to Kernel (409). The pseudo-credential is processed as described above in the prior art. The ultimate result is the access system responds by activating the appropriate relays FIG. 2C (211a through 211n). In accord with the prior art, this action allows the credential holder to register his floor selections with the elevator control machinery FIG. 2C (212).

The transaction timer is coupled to the most recent credential reading and continues to run after control returns to the kernel. After the transaction timer expires, any messages for that credential read are ignored. The credential indicium, in an embodiment of this invention, is used as a transaction identification as is illustrated in the message schematics shown in FIG. 7. Alternatively, a transaction number may be generated which couples indicium, the timer, and/or a read time to the transaction messages. Network routers and other interconnection devices might cause latencies or duplicated messages when certain network protocols are employed. A delayed or duplicated message could result in the resource being released again, some time after the credential holder has left the portal area. This problem is addressed by having credential transactions expire after some adjustable time. The network enabled access control panel tests the transaction's freshness with Timer Expired (407). If the transaction has gone stale, the message is ignored.

The portal unlock time, in a potential embodiment of this invention, is adjusted by sending a "Handicap" message indicating the credential holder needs more time to access the resource. The "Handicap" message, in a potential embodiment of this invention, includes an optional time field which indicates how much additional time may be required. The "Handicap" message is handled in a manner similar to the grant message. The "Handicap" message, in a potential embodiment of the invention, uses a second pseudo-credential to better enable the network enabled access control system to accommodate the needs of the credential holder. The second "Handicap" credential has the "Handicap" attributes as defined by the system administrator.

A test for a deny contact closure between the grant contact testing (429) and timer testing (430) is another embodiment of the present invention. If the deny contact closure was detected, then an appropriate message is transmitted and, subsequently, control would pass back to the kernel software (433). In a similar fashion, tests for the Handicap relay closure, in a potential embodiment of this invention, are incorporated between grant contact testing (429) and timer testing (430). However, it may be advantageous to send both the valid credential message (432) and the Handicap message if both contacts within the entity's legacy access control panel FIG. 1 (202a) are closed. Also, this Handicap message, in a potential embodiment of this invention, is generated if the entity's legacy access control system panel FIG. 1 (202a) holds the grant contacts closed for a period that exceeds a predefined threshold.

The Facility Code is used as a selector in an alternative embodiment. The network enabled access control panel FIG. 1 (110a) would transmit the indicium to a list of receivers FIG. 1 (107a through 107n) specific to the Facility Code.

An alternative embodiment transmits the "Virtual Card Read" message directly to the access control computer FIG. 1 (115) with an indication of the originating credential reader FIG. 1 (201a). The computer FIG. 1 (115) then sends an appropriate response to the partitioning resource panel FIG. 1 (208a) associated with the originating credential reader FIG. 1 (201a).

The network access panel FIG. 1 (110a) details are shown in FIG. 5. The network processor (501), the voltage source (507), the connections (510, 511, and 512), the I/O pins (513, 515), the input buffers (514, 516), and the pull up resistors (508, 509) are the representative components of the network enabled access control panel.

The operation of the network enabled access control panel FIG. 1 (110a) hardware can be understood by referring to FIG. 5. The network processor (501) ties to the network (112) via connection (113).

The Weigand interface for the reader is comprised of a "1" input (510), a "0" input (511), and a ground return (512). These lines are carried within the cable (106) which connects to the credential reader (201). Power and indication lines are also typically carried within the reader cable (106), but these have been omitted for clarity. In accord with common practice, pull-up resistors (508, 509) provide current from a 5 volt source (507) at the access panel. The optimal values of these resistors are determined by the reader manufacturer, but a typical value is 560 ohms. The input signals are conditioned by Schmitt buffers (514, 516) to provide proper electrical levels to network processor inputs (513, 515). As is known to those skilled in the art, ordinary buffers, in a potential embodiment of this invention, are used in lieu of the Schmitt buffers in certain applications. Additionally, the buffers, in a potential embodiment of this invention, are incorporated into the network processor (501). As this diagram is to illustrate the logical flow of the present invention's surge suppression circuitry typically included for electrical inputs from field equipment has been omitted for clarity.

Figure 7:
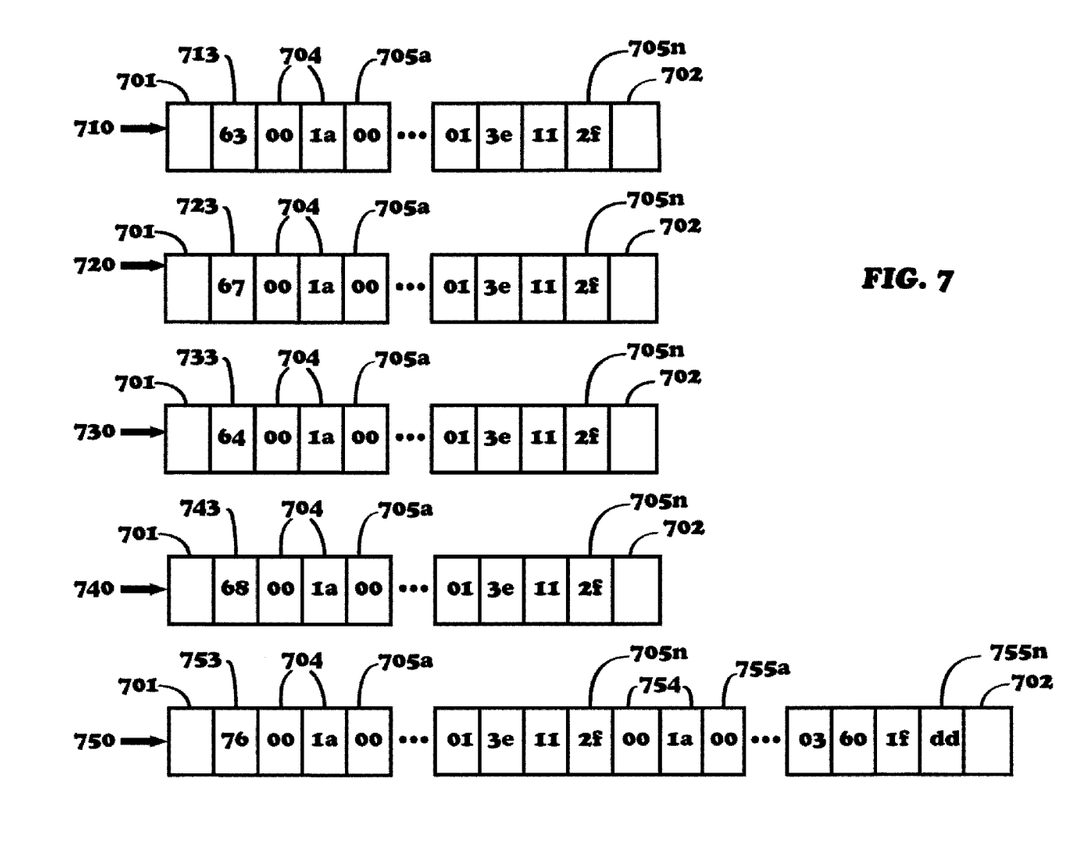
FIG. 7 illustrates network message coding.

When network enabled access control panel FIG. 1 (110a) receives a pseudo-credential message, FIG. 7 (750) the pseudo-credential indicium is extracted and processed just as if the pseudo-credential had been presented to the associated reader FIG. 1 (201a) in the prior art. That indicium is reflected to the access control computer FIG. 1 (115) which responds with a string to resource control panel FIG. 1 (208a), releasing the appropriate resource partitions.

An alternative embodiment uses the origin of a "Grant Message" FIG. 7 (710) to form the pseudo-credential associated with that receiver within the originating panel. The originating panel consults a list which associates the origin of the "Grant Message" with either the action of granting access or the generation and transmission of a pseudo-credential. The access control system processes that pseudo-credential indicium FIG. 7 (755a through 755n) as it would an ordinary credential, with the pseudo-credential's indicium, presented to the credential reader FIG. 2 (201) in the prior art.

An antifraud measure, as an alternative embodiment, incorporates a list of potential pseudo-credentials within the panel FIG. 1 (110a through 110n). The panel consults that list and discards any real credential reads with a pseudo-credential indicium.

Refer to FIG. 6. The network enabled microprocessor or network processor (601) is tied to the network (112) via connection (111). The voltage source (610), the connections (614, 615, 616, 617, 618, 619 and 620), the I/O pins (602, 604, 606, 608 and 621), the input buffers (607, 609, and 622), the open collector output buffers (603, 605) and the pull up resistors (611, 612, and 613) are representative components of the Pseudo-Reader panels shown in FIG. 1 (107a through 107n).

The pseudo-reader output that mimics a Weigand output is composed of output buffers (603, 605), presenting open collector outputs to the entity's legacy access control panel at points (614, 616). A ground return is provided at (615). All three signal lines connect with the entity's legacy access control panel (202) via cable (206). Another embodiment of this invention, buffers driven by network processor output lines (602, 604) are incorporated into the network processor itself. One implementation employs two sections of a TTL Hex Buffer, commonly known as a 7407, or its equivalent as the output buffer. Another implementation of the buffer uses two NPN transistors. Two resistors connect the respective bases of the transistors to the respective network processor output lines (602, 604), limiting the current flowing from the network processor output lines (602, 604) into the bases of the transistors. The transistor collectors connect to the respective output points (614, 616) and the transistor emitters connect to ground (615). Yet another embodiment of this invention uses the network processor output lines (602, 604) directly as the open collector buffering circuitry is incorporated into certain network processor outputs.

Weigand card reader inputs on an access control panel provide a current source through pull-up resistors and the access control panel monitors the circuits for closures of forty to seventy microseconds to ground. Each closure to ground indicating either a "1" or a "0" bit, as documented in Mr. Sprik's AN004.DOC on page 9. Each pulse is separated by an idle period of two milliseconds. It is undefined if both lines are closed to ground at the same time.

The network processor (601) transmits a "1"s bit by pulsing the buffer associated with the connection (616). The buffer associated with the connection (614) transmits a "0" bit when it is pulsed.

The network processor inputs (606, 608, and 621) monitor the entity's legacy access control panel outputs for Grant, Deny, and Handicap. Schmitt input buffers (607, 609, and 622) condition the signals to satisfy the input requirements of the network processor.

The entity's legacy access control panel (202) relay outputs connect with input terminals (617, 618, 620) and ground return (619) via cable (205). The Grant relay lower contact is connected to ground (619) and the upper contact is tied to input (617). The resistor (612) top terminal is tied to a voltage source (610). When the relay is relaxed, the voltage at the input point (617) is pulled by the resistor (612) to a value near the voltage source (610). When the entity's legacy access control panel (202) Grant relay is energized, the voltage at the input point (617) is brought to ground by the closure of contacts. The input buffer (607) adjusts this signal to the level appropriate for the network processor (601) input (606). As described above, when this contact closure is detected a either a "Pseudo-Credential Message" and/or a "Grant Message" will be generated and transmitted by the network processor (601) over the network (112). This "Pseudo-Credential Message" and/or the "Grant Message", in certain embodiments of this invention, is echoed to a monitoring computer FIG. 1 (115) for audit purposes.

The diagram shows Schmitt buffers (607, 609, and 622) to condition the relay contact outputs of the entity's legacy access control panel (202). An alternative embodiment of this invention employs either an ordinary buffer or a buffer incorporating de-bounce circuitry as required by the output characteristics from the entity's legacy access control panel (202).

Referring to FIG. 7, a network message coding is presented. Message (710) is an example credential message FIG.

4A (403). The multi-byte field (701), is the network message preamble required by network protocols. In the embodiment where UDP/IP (universal datagram protocol/internet protocol) is employed, it would contain the source computer identifier and routing information used by the network.

Additional information fields in the UDP/IP preamble are the message length and message error checking. Similarly, the multi-byte field (702) is the message post amble and in some network protocols contains error checking and other information. In UDP/IP, this field is null. Single byte field (713) is the species code indicating the message type. In this example, the ASCII character "c", shown as hexadecimal "63", indicates a Credential Request. The two byte field (704) indicates the number of bits in the credential. The multi-byte field (705*a* through 705*n*) shown is the right justified bits of the credential indicium, shown here as two digit hexadecimal numbers indicating the byte values. The credential indicium used as an example in these diagrams is the same as shown in FIG. 3A and FIG. 3B, a 26 bit card with a Facility Code 159 and Personal Identifier 2199.

Message (720) is an embodiment of a grant message. The multi-byte fields (701, 702) are the network message preamble and post amble described above. Single byte field (723) is the species code indicating the message type. In this example, the ASCII character "g", shown as hexadecimal "67", indicates a grant message. The two byte field (704) shown indicates the number of bits in the credential. The multi-byte field (705*a* through 705*n*) is the right justified bits of the credential indicium, shown here with two digit hexadecimal numbers indicating the byte values.

Message (730) is an embodiment of a deny message format. The multi-byte fields (701, 702) are the network message preamble and post amble described above. Single byte field (733) is the species code indicating the message type. In this example, the ASCII character "d", shown as hexadecimal "64", indicates a deny message. The two byte field (704) indicates the number of bits in the credential. The multi-byte field (705*a* through 705*n*) shown is the right justified bits of the credential indicium, shown here as two digit hexadecimal numbers indicating the byte values.

Message (740) is an embodiment of a handicap message. The multi-byte fields (701, 702) are the network message preamble and post amble described above. Single byte field (743) is the species code indicating the message type. In this example, the ASCII character "h" shown as hexadecimal "68" indicates a handicap message. The two byte field (704) indicates the number of bits in the credential. The multi-byte field (705*a* through 705*n*) shown is the right justified bits of the credential indicium, shown here as two digit hexadecimal numbers indicating the byte values.

Message (750) is an embodiment of a virtual card read message. The multi-byte fields (701, 702) are the network message preamble and post amble described above. Single byte field (753) is the species code indicating the message type. In this example, the ASCII character "v", shown as hexadecimal "76", indicates a virtual card read message. The two byte field (704) indicates the number of bits in the original credential. The multi-byte field (705*a* through 705*n*) shown is the right justified bits of the original credential indicium, shown here as two digit hexadecimal numbers indicating the byte values. The two byte field (754) indicates the number of bits in the pseudo-credential. The multi-byte field (755*a* through 755*n*) shown is the right justified bits of the pseudo-credential. The pseudo-credential indicium illustrated is a 26 bit format with a Facility Code 176 and Personal Identifier 4078.

An alternative embodiment of the multi-byte field (705*a* through 705*n*), uses the credential read time, a timer identifier, and/or the credential indicium to produce a unique identifier for the transaction.

Referring to FIG. 5 (501) and FIG. 6 (601), a typical embodiment of a network processor is found in either the Lantronics, Inc.) XPORT Embedded Ethernet Device Server or the Digi International Inc. ME connector style embedded module. An alternative embodiment of the network processor is implemented as microprocessor coupled with a network enabling peripheral.

Refer to FIG. 6. An alternative embodiment of the network processor (601) moves the credential indicium output generation into secondary processor or programmable logic array. An example of a secondary processor is found in the Texas Instruments MSP430 family of processors. Upon reception of a command from the network processor, the secondary processor generates the pseudo-reader pulses and/or monitor the legacy access control panel's outputs. The offloading of the pulse generation and/or input monitoring may offer cost or other advantages over using a single higher speed processor with five I/O pins as illustrated in (601). The two processors are interconnected with any one of a number of techniques known to those skilled in the art. Some interconnection techniques between the two processors are serial I/O, SPI, and I$^2$C protocols.

Moreover, though the description of the invention has included description of one or more embodiments and certain variation and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps are disclosed herein, and without intending to publicly dedicate any patentable subject matter.

The invention claimed is:

1. A system for integrating a plurality of autonomous access control systems, the system comprising:

a plurality of autonomous access control systems constructed and arranged to receive an input indicium, wherein at least one of said autonomous access control systems includes a reader for reading credentials from multiple users, each of the credentials having a coded indicium to uniquely identify a user, and wherein each of the autonomous access control systems includes a database containing a list of authorized credentials to enable activation of a control device to thereby allow access to authorized users;

a plurality of databases, one of said databases associated with one of said autonomous access control systems, each of said plurality of databases storing valid indicia of authorized users of one of said associated autonomous access control system;

one or more of said autonomous access control systems generating one or more output signals in the event of a match between the input indicium and one of said valid indicia stored in one of said databases, a plurality of receivers, each receiver associated with one of said autonomous access control systems, wherein one of said receivers generates an access control signal in response to receiving an output signal; and a data network connected to said receivers for receiving said access control signal, said access control signal transmitted via said data network to the control device of the first autonomous access control system to thereby create a pseudo-indicium read by the first autonomous access control system, to thereby allow access to authorized users.

2. The system of claim 1 wherein the coded indicium includes a facility code identifying an autonomous access control system and said databases store valid facility codes.

3. The system of claim 2 wherein said autonomous access control systems transmit said output signals to a set of receivers as defined by a list maintained within the said autonomous access control systems.

4. The system of claim 2 wherein said autonomous access control systems transmit said output signals to a set of receivers as defined by a list maintained within the said autonomous access control systems and the facility code of the coded indicia.

5. The system of claim 1 wherein said plurality of databases generate access denial control signals in the event of no match between an output signal from one of the plurality of autonomous access control systems and stored valid indicium in one of said databases and said access denial control signals transmitted via said data network to the control device of the autonomous access control system that generated an output signal to thereby deny access to a user.

6. The system of claim 1 and further including a timer connected to the control device for controlling an amount of time in which the control device must receive an access control signal to allow access to authorized users.

7. The system of claim 6 wherein said timer generates a message indicating an expiration of a time duration without said control device having received an access control signal.

8. The system of claim 6 wherein said timer generates a message indicating an access denial to a user.

9. The system of claim 1 wherein the access control signals include a code indicating an access portal hold open time for controlling the duration of operation of a control device.

10. The system of claim 9 wherein the hold open time is greater than a predetermined threshold value for users requiring longer portal access times and said access control signals further include a message transmittal to the control device indicating the authorized user requires a longer portal access time.

11. The system of claim 10 wherein said access control signals further include a message transmittal to the control device indicating the portal hold open time.

12. The system of claim 10 wherein the message is periodically transmitted during the portal hold open time.

13. The system of claim 12 wherein the databases control a number of messages periodically transmitted.

14. The system of claim 9 wherein the control device includes circuitry for limiting the hold open time.

15. The system of claim 1 and further including a monitoring device for providing an indication of an attempted use of an invalid credential.

16. The system of claim 1 and further including a monitoring device for generating an audit trail of control signals transmitted over said data network.

17. The system of claim 1 wherein said data network is an Ethernet network, a wireless network or packet-based network.

18. The system of claim 1 wherein the reader reads stored user credentials stored in the form selected from the group consisting of a data transponder, data carrying key fob and user biometric data.

19. The system of claim 1 and further including a monitoring device for providing serializing indicia of messages transmitted over the data network.

20. The system of claim 1, wherein said first autonomous access control system generates said output signal.

21. A system for integrating a plurality of access control systems, the system comprising:
an interface system having a reader for reading a user's credentials, the credentials having a coded indicium to uniquely identify the user;
a data network;
a plurality of receivers;
an access granting system having an access control device;
a first access control system having a first database having a first set of valid access credentials to enable activation of the access control device to thereby allow access to authorized users, the first access control system being associated with a first receiver; and
a second access control system having a second database having a second set of valid access credentials to enable activation of the access control device to thereby allow access to authorized users, the second set of valid access credentials being different from the first set of valid access credentials, the second access control system being associated with a second receiver;
wherein the interface system, the receivers and the access granting system are in signal communication with the data network;
wherein upon the reader of the interface system reading the user's credentials, the interface system sends a first signal to the first receiver, and if the first signal contains a match to a valid access credential in the first set of valid access credentials, the first receiver transmits a second signal to the access control device to allow access to the user;
wherein the access granting system generates a pseudo-indicium; and
wherein the access granting system reads the pseudo-indicium and the access control device grants access to the user.

22. The system of claim 21, wherein the interface system further comprises a third database having a third set of valid access credentials, wherein the pseudo-indicium is compared against the third database to determine whether or not to grant access.

23. The system of claim 22, wherein the third database is a building management's database.

24. The system of claim 21, wherein the interface system includes the access-granting system.

25. The system of claim 21, wherein the access granting system grants the user access to a first set of floors in an elevator system.

26. The system of claim 21, wherein
upon the reader of the interface system reading the user's credentials, the interface system sends a third signal to the second receiver, and if the third signal contains a match to a valid access credential in the second set of valid access credentials, the second receiver transmits a fourth signal to the access control device to allow access to the user, wherein said access is different from access granted by the second signal.

27. The system of claim 21, wherein the access control device activates a relay according to the pseudo-indicium received.

* * * * *